US005566098A

United States Patent [19]
Lucente et al.

[11] Patent Number: 5,566,098
[45] Date of Patent: Oct. 15, 1996

[54] ROTATABLE PEN-BASED COMPUTER WITH AUTOMATICALLY REORIENTING DISPLAY

[75] Inventors: Samuel A. M. Lucente, Stamford, Conn.; Peruvemba S. Balasubramanian, Chappaqua, N.Y.; Richard F. Sapper, Milan, Italy; Nathan J. Lee, New City, N.Y.

[73] Assignee: International Business Machines Corporation, Armonk, N.Y.

[21] Appl. No.: 380,121

[22] Filed: Jan. 30, 1995

Related U.S. Application Data

[62] Division of Ser. No. 975,834, Nov. 13, 1992, Pat. No. 5,432,720.

[51] Int. Cl.[6] .................................................. G06F 1/00
[52] U.S. Cl. ................................. 364/708.1; 361/681
[58] Field of Search ........................... 364/708.1, 709.1, 364/709.9, 709.11, 709.13; 345/126, 143; 361/681, 682, 683

[56] References Cited

U.S. PATENT DOCUMENTS

D. 321,179  10/1991  Oyama .
D. 322,063  12/1991  Oyama .
D. 339,796   9/1993  Goodner et al. .
5,109,354    4/1992  Yamashita et al. .
5,133,076    7/1992  Hawkins et al. .
5,142,626    8/1992  Arnold et al. .
5,257,164   10/1993  Perez et al. .

OTHER PUBLICATIONS

"Pen PCs" *PC Magazine*, Nov. 10, 1992 Edition; pp. 175–178, 182–186, 191–196, and 199–203.

*Primary Examiner*—Tan V. Mai
*Attorney, Agent, or Firm*—Calfee, Halter & Griswold

[57] ABSTRACT

A pen-based computer including a housing and a flat display integral therewith. The flat display can display an image corresponding to text, data and graphic information in several orientations. A plurality of switches enables the user to select an orientation for the image relative to the orientation of the flat display. In one embodiment the switches are mercury switches positioned to automatically align the orientation of the image relative to motion of the flat panel display relative to the force of gravity. An optional additional switch resets the orientation of the image to a predetermined orientation or prevents the reorientation of the image responsive to the mercury switches.

31 Claims, 8 Drawing Sheets

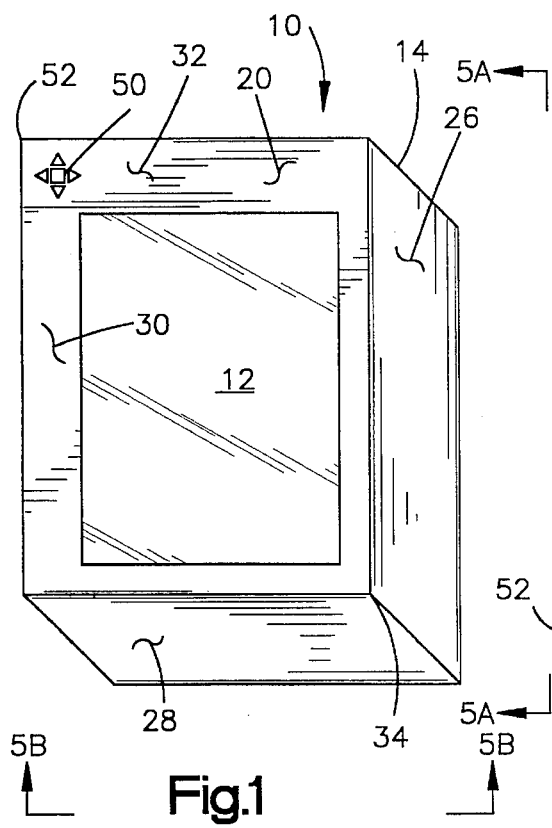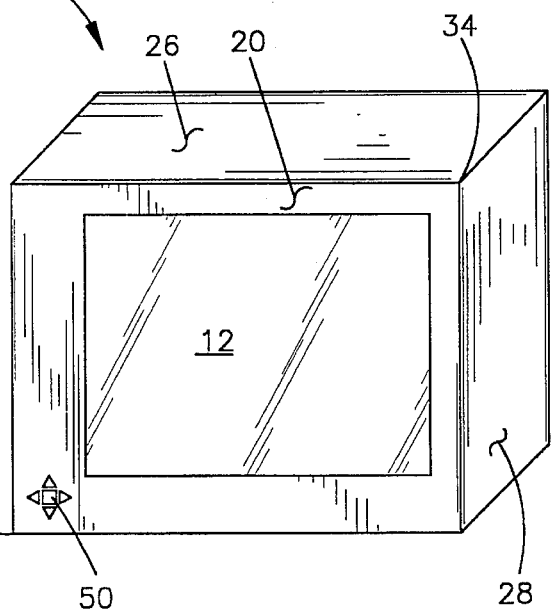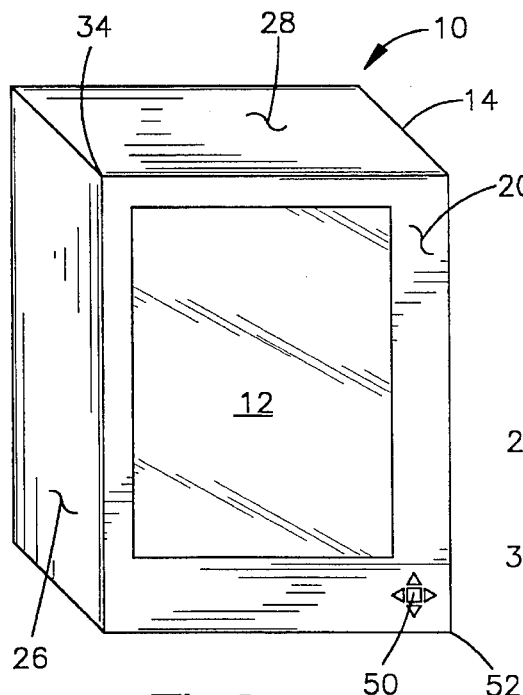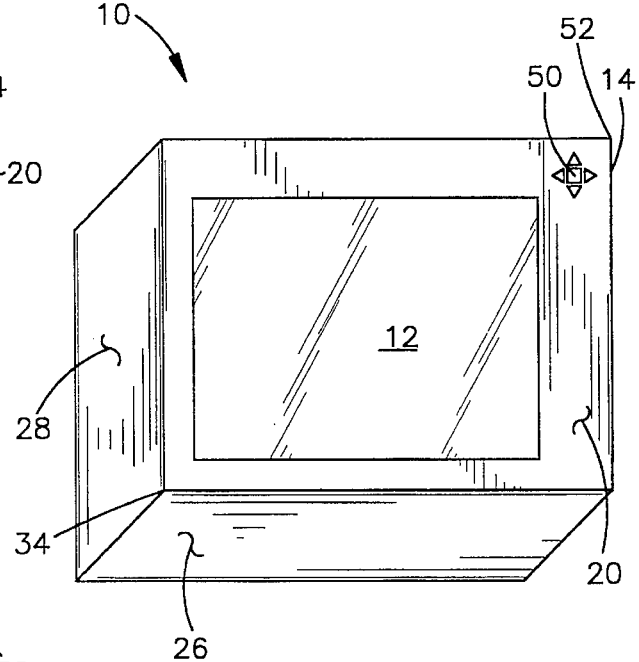

0° ROTATION : $(2\pi k)$

OFFSET ADDRESS = $(640 \times i) + j$

90° ROTATION : $(2\pi k + \pi/2)$

OFFSET ADDRESS = $(639 - i) + (640 \times j)$

180° ROTATION : $(2\pi k + \pi)$

OFFSET ADDRESS = $(639 - i) \times 640 + (639 - j)$

270° ROTATION : $(2\pi k + 3\pi/2)$

OFFSET ADDRESS = $(639 - j) - 640 + i$

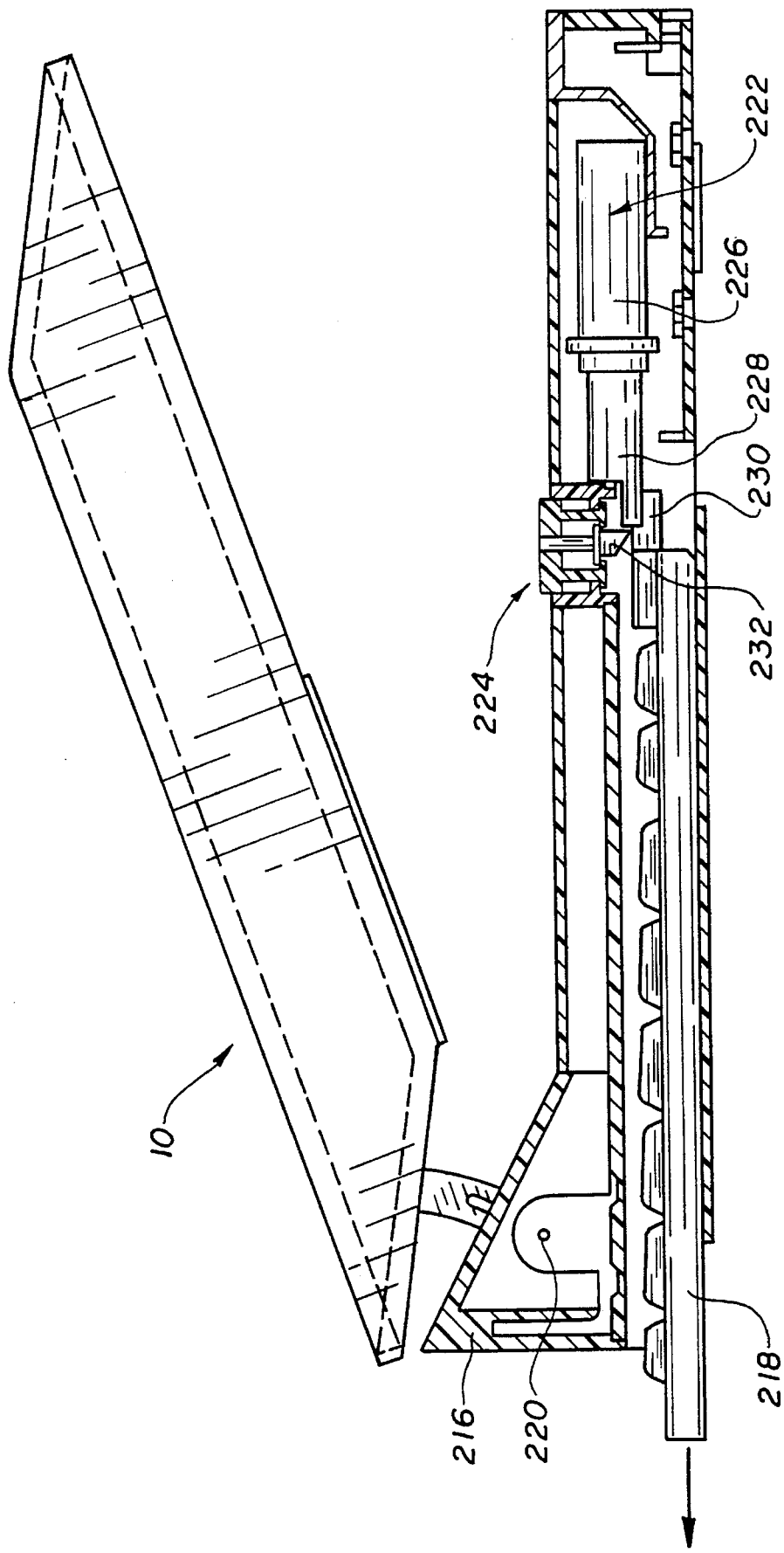

ROTATABLE PEN-BASED COMPUTER WITH AUTOMATICALLY REORIENTING DISPLAY

This is a divisional of application Ser. No. 07/975,834 filed Nov. 13, 1992 U.S. Pat. No. 5,432,720.

FIELD OF THE INVENTION

The present invention relates generally to computers and computer displays, and more particularly to a pen-based computer with an integral flat panel display and digitized screen.

BACKGROUND

Recent developments in computer technology have been directed toward increasing the speed and power of computers while maintaining their compactness. Commonly available computers for a multitude of application software programs, such as wordprocessing and spreadsheet tasks, have a full-size keyboard; a relatively large housing enclosing a CPU and one or more disk drives; and a CRT monitor which can be located and supported on top of the housing. The keyboard allows information to be inputted into the CPU for processing and display on the monitor. Typical examples of such computers are the IBM PS/2 series of non-portable desktop personal computers.

Although these non-portable desktop personal computers have been developed with the speed and power to handle a multitude of application software programs, the size and weight of these computers typically relegates them to a desk top or computer stand.

However, "portable" and/or "lap-top" computers have emerged as fulfilling the above-mentioned criteria for speed as well as convenience and transportability. These types of computers have a keyboard connected (sometimes integrally) to a relatively small housing enclosing a CPU and one or more disk drives. A lightweight, relatively thin flat panel display is typically attached to the housing and can be tilted upwardly, downwardly and/or removed for viewing. Again, the keyboard is utilized to input information into the CPU for processing and to output information on the flat panel display. The keyboard, CPU and flat panel display are relatively compact units which can be as small as a briefcase for easy transportability.

Still other developments in computer technology have lead to "notebook" computers, which as the name suggests, approximate the size of a notebook or tablet. These types of computers maintain the speed and power of the non-portable, portable and lap-top computers in a still smaller and compact design. The notebook computer typically has a CPU and a flat panel display mounted within a housing. A keyboard is connected to the computer for entering information into the CPU for processing and display on the flat panel display. Commercially available notebook computers of this type are marketed by the IBM Corporation under the marks/designations ThinkPad 700™ and ThinkPad 700C™.

Further, a more recent development in computer technology has lead to "pen"-based computers (also referred to as "hand-held", "tablet", "clipboard", "pen-top" or "hybrid" computers), which are as small (or smaller) and as versatile as the notebook computer, but use a digitized screen for input of information, rather than a keyboard. The digitized screen can comprise an electromagnetic digitizer, a touch screen (resistive) overlay, or other proximity-sensitive screen devices which provide a digital output corresponding to the location of a stylus or finger on the screen. The touch screen overlay senses the pressure of a stylus or finger on the screen; while the electromagnetic digitizer either comprises a screen grid which senses a magnetic signal emanating from a specially designed stylus, or alternatively, comprises a stylus having a coil which senses a position signal emanating from the screen. The digitized screen can be coupled with handwriting recognition software to input information directly into the CPU. A commercially available pen-based computer is marketed by the IBM Corporation under the mark/designation ThinkPad 700T™.

Although the pen-based computer offers increased flexibility over notebook, non-portable, portable and lap-top computers in being able to easily transport the computer while still maintaining sufficient speed and power for a wide variety of application software programs, the pen-based computer can still be somewhat awkward to use. In particular, pen-based computers typically have a rectangular box-like shape having squared corners, with the flat panel display mounted integrally in the upper surface of the computer but still supported some distance away from the support surface (e.g., from the table top). In using the pen-based computer with a digitized screen, the palm of the hand typically rests on the side of the computer housing when the information is inputted using a stylus. The user attempts to enter the information using normal writing techniques and hand positioning. However, with the box-like shape and squared corners, the user can feel awkward supporting the hand in this way over periods of time, and can have difficulty gripping and holding the pen-based computer and picking up the pen-based computer from a support surface.

Further, the pen-based computers can be particularly uncomfortable for left-handed writers. This is typically due to the ergonomic configuration of the pen-based computer, which is designed primarily for use by right-handed persons. Left-handed writers tend to "curl" the hand around the top of a writing pad. However, the sharply angled design of the typical box-like pen-based computer also makes this writing style awkward and uncomfortable.

Finally, the known pen-based computers are generally designed to rest flat on a support surface or to be held on a lap during use. These pen-based computers do not have integral legs or other supporting devices which enable the computer to be angled on a support surface for proper viewing while still maintaining a comfortable writing surface in both portrait or landscape orientations.

In any case, there is a demand in the industry for a pen-based computer which is comfortable to use and which can easily accommodate both right-handed and left-handed writers.

SUMMARY

The present invention relates to a pen-based computer which has a configuration which enables both left-handed and right-handed writers to input information comfortably and efficiently. The pen-based computer includes a digitized flat panel display and an ergonomically-designed housing having a configuration which can be used by left-handed writers when the housing is in one orientation, and by right-handed writers when the housing is in another orientation. The configuration of the housing further enables both left-handed and right-handed writers to use the computer when the flat panel display is in either a portrait orientation (vertically aligned) or landscape orientation (horizontally aligned). In any of these orientations, a switch device changes the display on the flat panel display such that the display maintains the correct alignment for proper viewing.

The housing for the pen-based computer has a slanted parallelepiped configuration with upper and lower rectangular surfaces. The digitized flat panel display is mounted on the housing proximate one corner of the upper rectangular surface. The side and end surfaces of the housing extend at an angle of between about 10 and 45 degrees from the upper surface to the lower surface, and preferably at an angle of about 22 degrees, to enable the computer to be comfortably used. One side and end surface is visible from the top of the computer, while the other side and end surface is visible only from the bottom of the computer.

For right-handed writers, the housing is oriented such that the upwardly visible side and end surfaces are located on the right side and lower end of the housing to enable the user to rest the palm of the right hand on these surfaces for use in the portrait mode (flat panel display vertically aligned). The housing can then be rotated 90 degrees counterclockwise into another orientation wherein the upwardly visible side and end surfaces are located on the top end and right side of the housing to enable the right-handed writer to rest the palm of the right hand on these surfaces for use in the landscape mode (flat panel display horizontally aligned).

Alternatively, for left-handed writers, the housing is rotated a further 90 degrees counterclockwise such that the upwardly visible side and end surfaces are located on the left side and top end of the housing to enable a left-handed writer to rest the palm of the left hand on these surfaces for use in the portrait mode (flat panel display vertically aligned). Finally, the housing can be rotated a still further 90 degrees counterclockwise into another orientation wherein the upwardly visible side and end surfaces are located on the left side and lower end of the housing to enable the left-handed writer to rest the palm of the hand on these surfaces for use in the landscape mode (flat panel display horizontally aligned). In any of the orientations described above, the user can rest the palm of the writing hand on the respective side or end surface for comfort and ease of writing.

The flat panel display for the pen-based computer has a digitized (preferably electromagnetic) screen for input of information to the CPU. A switch is located in the housing preferably at the opposite edge of the upper surface from the flat panel display to change the display on the flat panel display for proper viewing in any of the above-described orientations. The switch provides for automatic or manually selectable reformatting of the addresses of the data locations on the screen such that the display data is aligned on the flat panel display correctly in any of the orientations described above.

The pen-based computer includes display legs stored in recesses in the back surface of the computer housing. The display legs can be pivoted outwardly away from the housing for angled viewing and writing on a horizontal surface in either the portrait or landscape orientation. The slanted parallelepiped-shaped housing, and in particular the angle of the side and end surfaces which taper down to a thin peripheral edge (preferably 5 mm), facilitates supporting the angled computer on a horizontal support surface (e.g., a table top) in a comfortable writing position and at a proper viewing angle. Alternatively, the display legs can be stored in their recesses and the computer can be hung on a wall or supported on a lap. Finally, the pen-based computer can be linked to peripheral equipment (keyboards, printers, hard disk drives, etc.) for further application software program capabilities.

Accordingly, it is one object of the present invention to provide a pen-based computer which can be easily and comfortably used by both left-handed and right-handed writers. The pen-based computer has a configuration which provides a comfortable writing surface and proper viewing angle when the computer is supported either on a flat surface or at an angle. The configuration of the pen-based computer further enables the computer to be comfortably gripped, held, and easily picked-up from a support surface.

Further, it is another object of the present invention to provide a pen-based computer having a flat panel display with a rotating function which enable the computer to be rotated in 90 degree increments while maintaining correct alignment of the text, data and graphics on the flat panel display.

Additional objects of the present invention will become further apparent from the following detailed description and drawings which form a part of the specification.

IN THE DRAWINGS

FIG. 1 is a top plan view of the pen-based computer constructed according to the principles of the present invention wherein the computer is in a right-handed portrait orientation;

FIG. 2 is a top plan view of the pen-based computer of FIG. 1, wherein the computer is rotated 90 degrees into a right-handed landscape orientation;

FIG. 3 is a top plan view of the pen-based computer of FIG. 2, wherein the computer is rotated an additional 90 degrees into a left-handed portrait orientation;

FIG. 4 is a top plan view of the pen-based computer of FIG. 3, wherein the computer is rotated an additional 90 degrees into a left-handed landscape orientation;

FIG. 13 is a sectional view of the storage and retrieval system of FIG. 12 in which. the keyboard is shown in a partially removed and unlocked position.

DETAILED DESCRIPTION OF THE PREFERRED EMBODIMENT

Figure 5A:
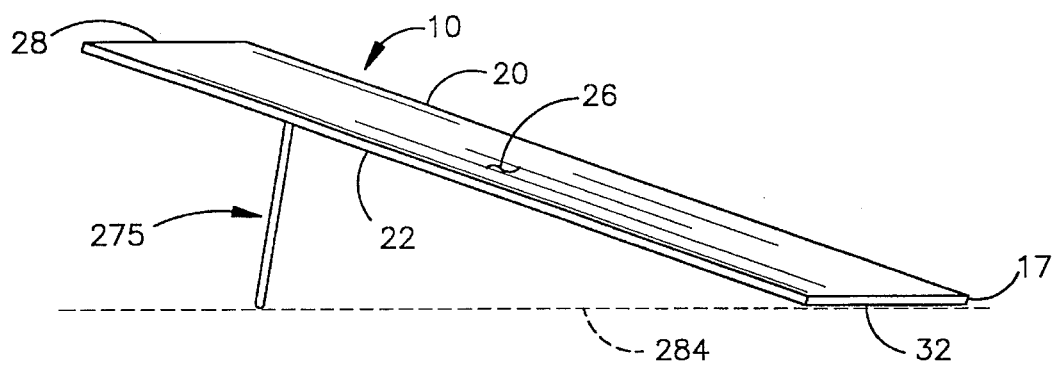
FIG. 5A is a right side view of the pen-based computer of FIG. 1.

Referring to the drawings, and initially to FIGS. 1–7, a pen-based computer is illustrated having a housing 10 with a display flat panel display 12. The housing 10 encloses electronics and/or software (described in more detail hereinafter) which enable the computer to provide application software programs such as wordprocessing and spreadsheet tasks, and to display text, data and graphic information on the flat panel display 12.

The housing for the pen-based computer includes an top housing portion 14 and a bottom housing portion 16 connected together along the edge 17 of the housing. The top housing portion 14 is preferably formed from carbon fiber reinforced plastic for durability; while the bottom housing portion 16 is preferably formed from magnesium for thermal heat dissipation.

The top and bottom housing portions of the pen-based computer together form a slanted parallelepiped. The slanted parallelepiped shape can be a rhombohedron; however, the present invention is not limited to such an equilateral parallelepiped. In particular, the slanted parallelepiped-shaped housing includes a substantially planar top surface 20, and a parallel substantially planar bottom surface 22. The top surface 20 and the bottom surface 22 each have a rectangular configuration in plan view and are slightly offset from one another.

The side and end surfaces of the slanted parallelepiped-shaped housing extend at an angle from the top surface 20 to the bottom surface 22. In particular, referring to FIG. 1, both the right side 26 and the lower end 28 extend at an angle of between about 10 and 45 degrees from the top surface to the bottom surface of the housing, and preferably at an angle of about 22 degrees. The right side and lower end have surfaces which face upwardly and are exposed in the top plan view of FIG. 1.

Forming the other side and end surfaces of the slanted parallelepiped are a left side 30 and the upper end 32. Both of the left side and upper end also extend from the top surface to the bottom surface at an angle of between about 10 and 45 degrees, and preferably at an angle of about 22 degrees. However, the left side and upper end are not visible from the top plan view of FIG. 1, but rather are exposed in the bottom plan view shown in FIG. 6. Finally, each side and end surface tapers down to the distal edge 17 which is about 5 mm thick and extends around the entire periphery of the housing. With any of the side and end surfaces described above, these surfaces can be textured to facilitate grasping.

The flat panel display 12 for the computer housing is mounted proximate one corner 34 of the top surface 20 of the housing. This corner is adjacent the right side 26 and the lower end 28 of the housing. As will be described herein in more detail, the location of the flat panel display proximate this corner provides a design which is comfortable to use for writing over periods of time.

The flat panel display 12 for the pen-based computer comprises a digitized Thin Film Transistor (TFT) 35 with a backlit screen 36 which displays text, data and graphic information and which enables information to be input directly into the CPU via the screen. The digitized screen preferably has an electromagnetic digitizer 37 controlled by digital control logic 38, although a touch overlay digitizer screen could also be used with the present invention. Software-based prompts and graphics can facilitate the information input on the screen. A TFT backlit screen appropriate for the present invention is available from the IBM Corporation with the ThinkPad 700T™, although other types of digitized screens could be used with the present invention.

The flat panel display 12 for the pen-based computer can be used in a number of orientations. For example, the flat panel display can be supported on a base or on display legs as will be described below, or can be held by hand or in a lap. In any case, the flat panel display can be rotated into either a "portrait" orientation, in which the screen is oriented vertically (FIGS. 1,3); or rotated into a "landscape" orientation, in which the screen is oriented horizontally (FIGS. 2,4). The different orientations of the pen-based computer of the present invention will be discussed in more detail below.

The electronics for the pen-based computer preferably include a 486SLC/50 based central processing unit (CPU) 39 having up to 16 MB memory 40 for executing instructions and manipulating data; solid state mass storage system 41 having a removable 60 MB memory card, such as found in the IDE Series marketed by SunDisk Corp.; and an audio subsystem 42 using an IBM M-wave digital signal processor. The CPU is interconnected to the flat panel display through the customary buffers, busses, clocks and latches (see, e.g., FIG. 7). Disk drive(s) 43 can be incorporated into the electronics if necessary. Further, a remote power source 44 and control 45 (e.g., an AC power source through an input 46), can be included to power the CPU and disk drives; or a rechargeable battery pack 47 (and sub-battery 48) can be included with the computer for portable use. Such power supplies are conventional and well known to those skilled in the art. By way of example, a preferred electronic package of the type described above is found in the IBM ThinkPad 700T™. Further, the interested reader is referred to Arnold, et al, U.S. Pat. No. 5,142,626, for "Personal Computer with Removable Media Identification"; and W. Rosch, "The WINN Rosch Hardware Bible", Simon & Schuster, Inc., New York, N.Y. (1989) for disclosures of the electrical components of a computer. However, the electronics described above are only exemplary in nature and can be modified depending on the particular speed and power considerations of the computer.

For display on the flat panel display 12, the electronics include a video RAM 49 with 512K bytes. The addresses stored in the video RAM can be accessed in different ways to provide user-defined output, as will be described in detail below. Typically the addresses are accessed to provide a display which, in the case of text, reads from left to right and top to bottom when the flat panel display is in a portrait orientation (vertically aligned such as illustrated in FIG. 1). However, the addresses in the video RAM can be changed such that the output is displayed from bottom to top and left to right. The display will then have the correct alignment if the flat panel display is rotated into a landscape orientation (horizontally aligned such as in FIG. 2). By having the output of the video RAM changeable relative to the axis of the computer, the housing can be rotated into different orientations with the display maintaining correct alignment for proper viewing.

Figure 8:
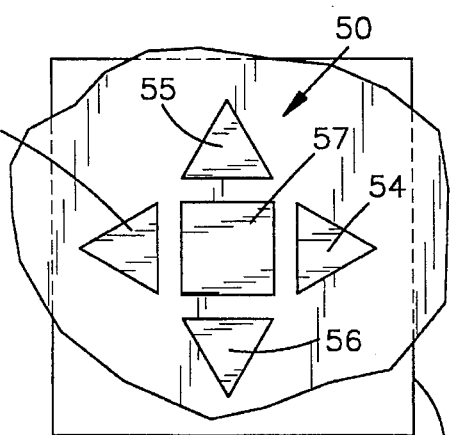
FIG. 8 is an enlarged schematic illustration of the mechanical switch for the pen-based computer.
Figure 7:
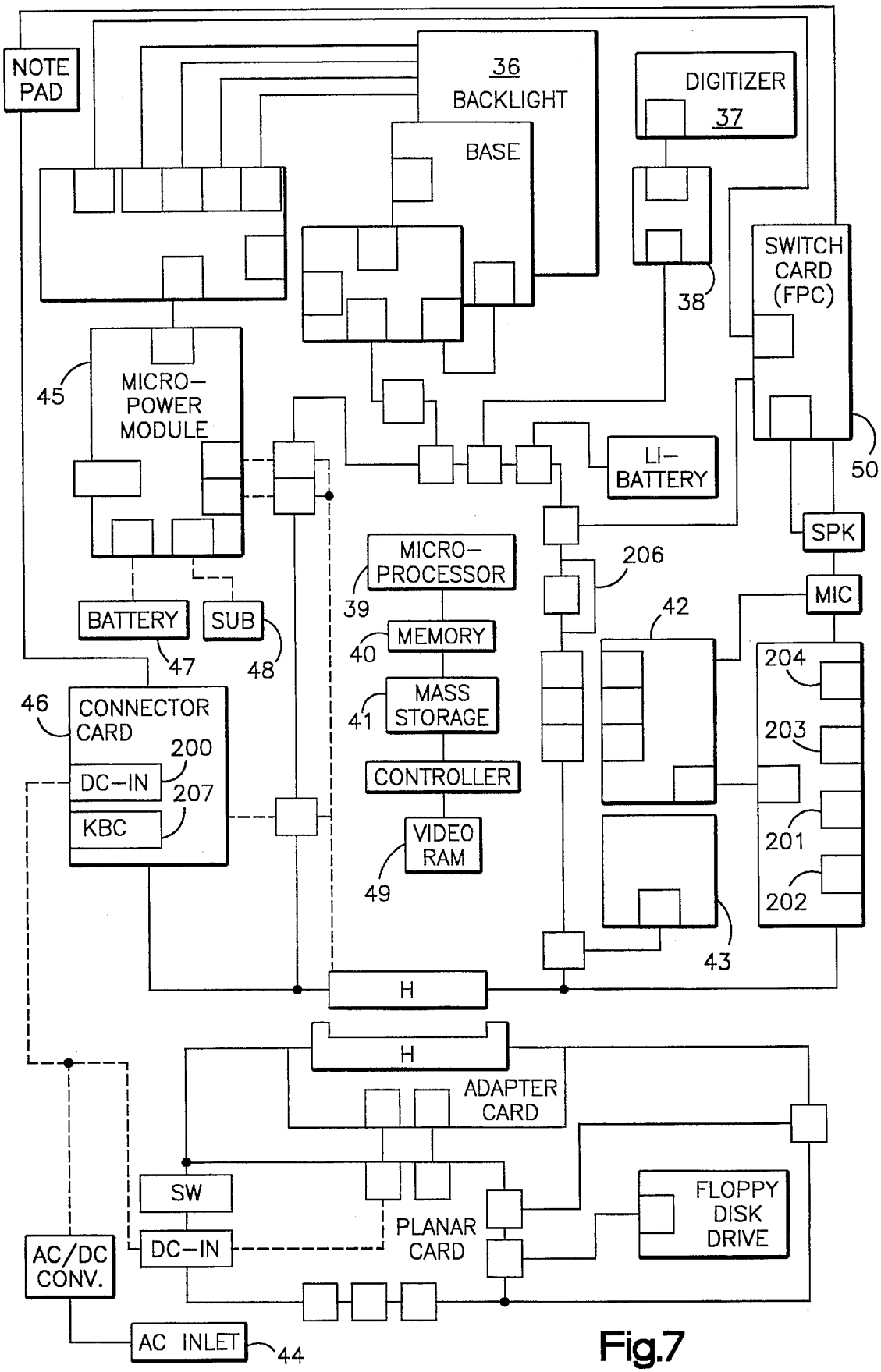
FIG. 7 is a schematic illustration of the electrical components of the pen-based computer.

The electronics for the computer further include a mechanical switch 51 which accesses the video RAM to select the output of the video RAM. The switch 51 can be located at the opposite corner 52 of the upper surface from the flat panel display and can be manually manipulated to change the display on the flat panel display for proper viewing in any of the above-mentioned orientations. As illustrated in more detail in FIG. 8, the mechanical switch 51 preferably includes five position buttons: left button 53, right button 54, up button 55, down button 56 and reset/default button 57, which are each accessible from the outer surface of the housing.

The mechanical switch 51 is located over a printed circuit board 58 to provide a digital output to the CPU and to "rotate" the screen display if necessary. The circuit board can be incorporated into a switch card 50 in the electrical layout (see FIG. 7), or at another appropriate location. As will be described below, each position button 53–56 can be manually manipulated to change the orientation of the screen display to align the display with a certain axis of the computer, while the reset/default button 57 resets the display to a program-defined alignment (e.g., a landscape orientation for a spreadsheet task), or in the case of a mercury switch, prevents the rotation of the screen display if desired.

Alternatively, it is also within the scope of the present invention to provide a switch mounted within the housing of the computer. Such a switch could be e.g., a mercury switch (not shown) having a ring-shaped frame with four recesses. As the orientation of the computer is changed, the mercury flows into a particular recess in the frame and outputs a position signal. The position signal indicates the orientation of the computer so that the display can be aligned appropriately.

Figure 9:
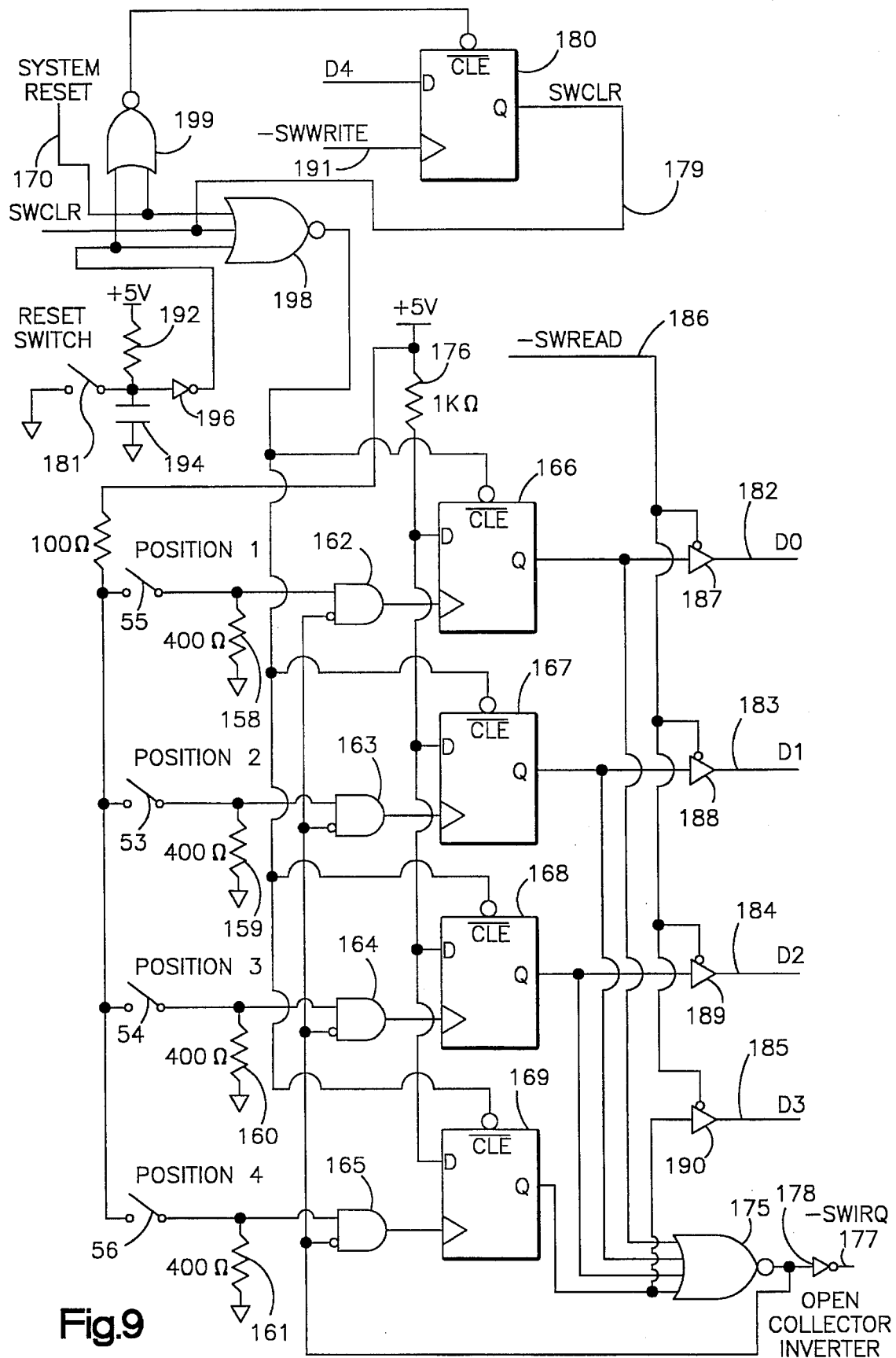
FIG. 9 is a schematic of the electronics of the rotating function of the present invention.

With respect to the mechanical switch 51, as illustrated in FIG. 9, the position buttons 53–57 are pulled down to ground by pull-down resistors 158–161 normally causing the output of 2-way AND gates 162–165 to be low. The D-Latches 166–169 are reset with the SYSTEM RESET 170 at the power on time. Consequently, the outputs of D-latches 166–169 are reset to low level, 0. The output of four way OR gates 175 is, therefore, 0 enabling the AND gates 162–165. While the outputs of four D-latches 166–169 are low, if any one of the position buttons 53–57 is pressed, the output of the corresponding 2-way AND gates 162–165 will become high and clocks the corresponding D-latches 166–169. Since the D input of these D-latches 166–169 is pulled up high via a pullup resistor 176, the output of the corresponding D-latches 166–169 becomes high. This event will cause –SWIRQ 177 to go active low through an open collector inverter 178 causing an interrupt to the CPU. At the same time, the very same output of the D-latches 166–169 will cause the 2-way AND gates 162–165 to be disabled outputting 0's. This locks up any further inputs from the position buttons until the D-latches are cleared either by CPU via SWCLR signal 179 from D-latch 180 or by pressing RESET SWITCH 181.

Once the CPU is interrupted, the CPU will read the outputs on D0–D3 (182–185, respectively) by activating –SWREAD 186 (a decoded read probe). When –SWREAD is low, the tri-state buffers 187–190 are enabled; while when –SWREAD is high, the output will be tri-state, regardless of the input to the buffers. If more than one bit is set to 1 by pressing more than one position buttons, the CPU can either discard the input and report an error message to the user, or use one of the position buttons as an input. For example, if the position buttons 55 and 54 are pressed together at the same time by mistake, the software can default to less angle of rotation, or can return an error message. With a locking mechanism, such a situation cannot occur in most cases.

Figure 10:
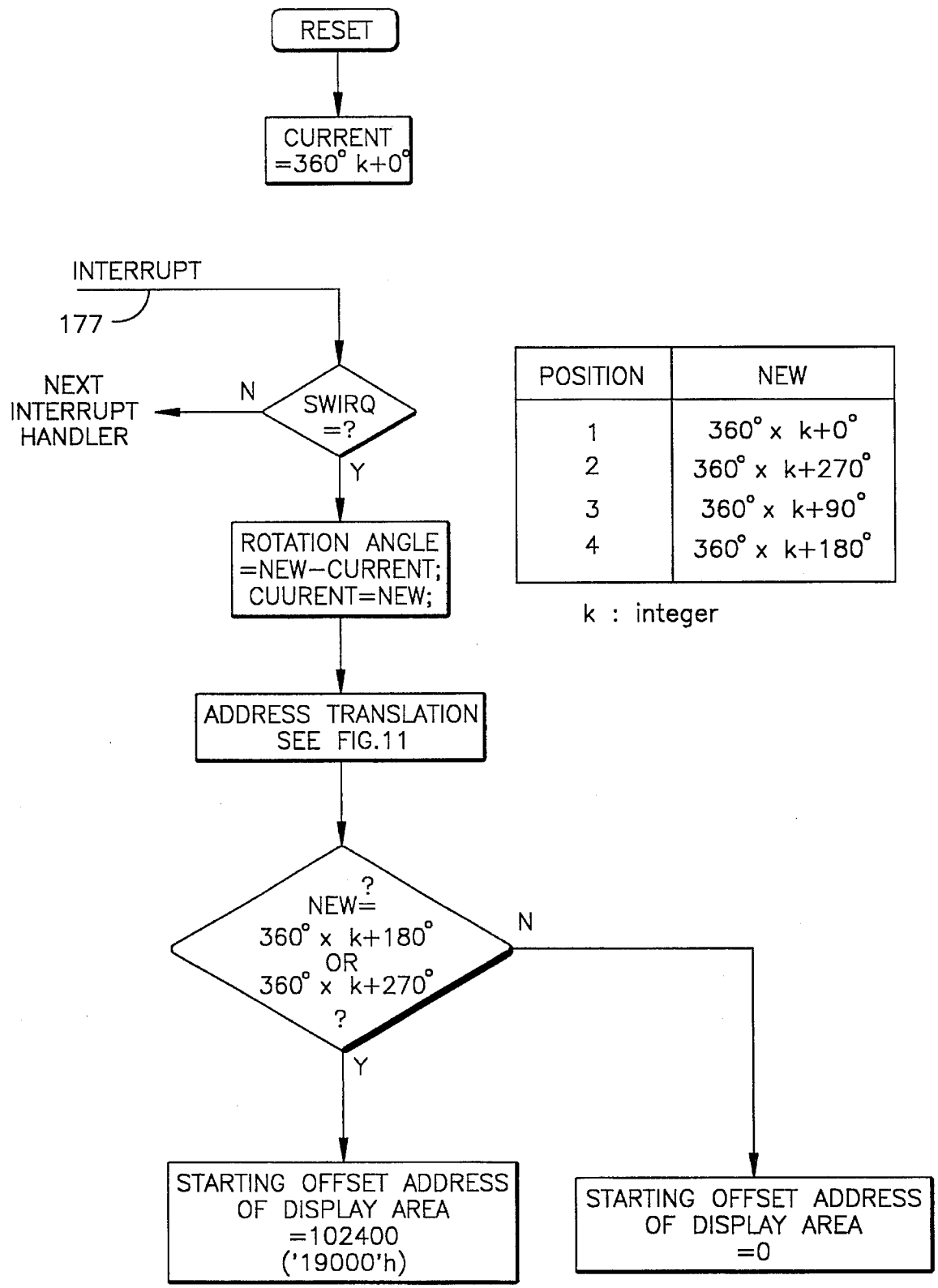
FIG. 10 is a flow chart illustrating the rotating scheme.
Figure 11:
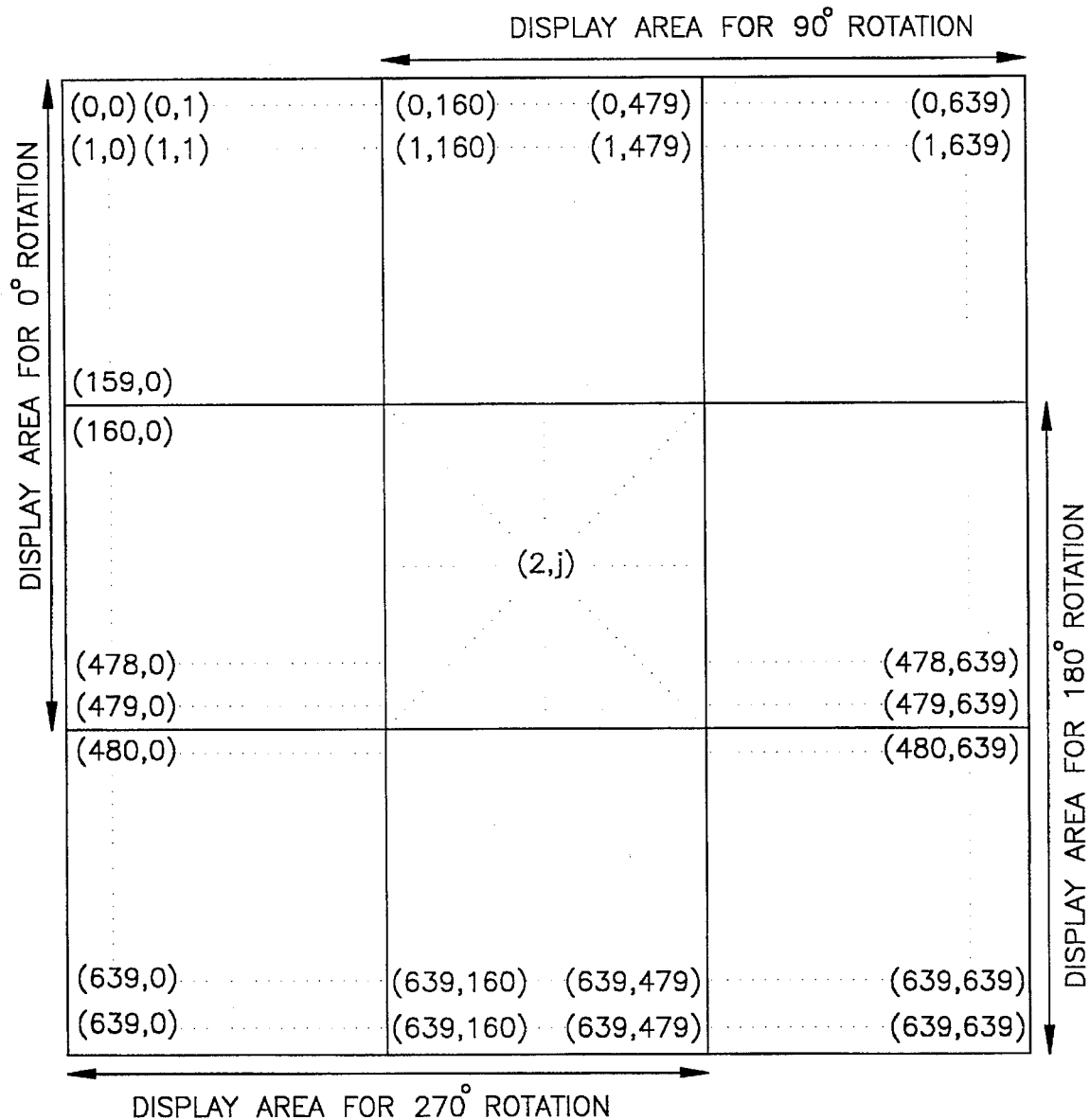
FIG. 11 is an equation table illustrating the equations used for the rotating function.

FIG. 10 shows the flow chart of the CPU process once the interrupt (on –SWIRQ) is detected. When CPU finds that one of these four bits is turned on, it computes the rotation angle using an equation: Rotation Angle=New Position–Current Position. The CPU then assigns the new position as the current position. Using the equations shown on FIG. 11, the address of video data will be translated. This is possible since the one picture element (PIXEL) of this system is 8 bit similar to XGA and the video data is stored in a contiguous memory. Since IBM non-portable desktop personal computers reserve only 128K bytes of memory locations for video memory address, only 128K bytes of memory will be visible to the system out of 409600 bytes of the video buffer. Using this fact, the starting address of the video memory can be dynamically changed. In case the button 53 or 56 is selected, the starting offset address should be 19000 hex. On the other hand, if the button 55 or 54 is selected, the starting offset address should be 0. In case button 53 or 56 is selected, the display should be able to shift the window area so that it can show hidden area.

Once the rotating task is completed, the CPU will write 1 to the SWCLR register 179 in D-latch 180 by activating –SWWRITE 191 (a decoded write probe) in FIG. 9. This will activate SWCLR 179 to 1 causing a clear to D-latches 166–169. Consequently, this event unlocks the 2-way AND gates 162–165 so that the logic can accept the next user input. The CPU also has to make sure to write 0 after the clear operation is finished in order to accept the next input. In case the user wants to unlock the AND gates 162–165 or deactivate the SWCLR signal, the user can press the RESET SWITCH 180. When the RESET SWITCH is pressed, an R-C (Resistor-Capacitor) circuit 192, 194 will delay the charging of the capacitor 194 providing a low level pulse to the input of a Schmitt triggered inverter 196. This event will cause a low pulse at the output of the three way NOR gate 198 and a low level pulse on the output of 2-way NOR gate 199 to D-latch 180, clearing all D-latches 166–169, 180 on FIG. 8.

The housing 10 for the computer is ergonomically designed to provide comfortable use for finger and stylus writing in a normal manner. In particular, referring again to FIGS. 1–6, the slanted parallelepiped shape of the housing allows a writer to rest the palm of the hand on the angled side and lower edge surfaces 26, 28 for comfort during text, data, and information entry. As described previously, for a right-handed writer, the computer will be in at least one orientation and the user will have a palm rest for the right hand, while for a left-handed writer, the computer will be in at least one other orientation, and the user will have a palm rest for the left hand. For the left-handed writer in particular, the additional palm rest across the top of the computer (see, e.g., FIG. 3) facilitates entering information on the flat panel display with a stylus.

Moreover, the location of the flat panel display adjacent one corner of the upper surface also enables the writer to use a comfortable and normal writing style on the flat panel display. This is due in part to the positioning of the hand on the side or end surface which requires the monitor to be proximate these locations for writing. In sum, it has been determined that by having the side and end surfaces extend at an angle of between 10 and 45 degrees, and preferably at an angle of about 22 degrees, and a flat panel display which is located adjacent one corner of the upper surface, the pen-based computer provides comfortable entry of information onto the flat panel display of the computer, for both right-handed and left-handed writers.

The operation of the computer will be described briefly. For a right-handed writer, the pen-based computer is oriented such as illustrated in FIG. 1 where the side surfaces 26, 28 are located along the right side and bottom of the housing, respectively, and the flat panel display 12 is vertically aligned. The "up" button 55 on the switch 51 is then selected to align the screen display properly with the orientation of the computer. In this orientation, the right-handed writer can comfortably use the computer in the portrait mode. In particular, the writer can rest the palm of the writing hand along the upwardly facing right side and lower end surfaces during input.

For using the computer in the landscape mode, the housing can be rotated 90 degrees (counterclockwise) into the orientation illustrated in FIG. 2, where the surfaces 26, 28 are located along the top and right side of the housing, respectively, and the flat panel display 12 is horizontally aligned. The "right" button 54 is then selected to align the screen display properly with the orientation of the computer. In this orientation, the right-handed writer can comfortably use the computer in the landscape mode. Again, the writer can rest the palm of the writing hand along the upwardly facing right side and upper end surfaces of the housing during use.

Further, for a left-handed writer, the housing can be rotated an additional 90 degrees (counterclockwise) as illustrated in FIG. 3, where the flat panel display 12 is again vertically aligned. In this orientation, however, the housing is oriented such that the surfaces 26, 28 are located along the left side and top of the housing, respectively, and the flat panel display 12 is vertically aligned. The "down" button 56 is then selected to align the screen display properly with the orientation of the computer. In this orientation, the left-handed writer can comfortably use the computer in the portrait mode. Again, the writer can rest the palm of the hand along the upwardly-facing left side and upper end surfaces of the housing during input.

Finally, the housing can be rotated 90 degrees (counterclockwise) into another orientation illustrated in FIG. 4 where the surfaces 26, 28 are located along the left and bottom sides of the housing, respectively, and the flat panel display 12 is horizontally aligned. The "left" button 53 is then selected to align the screen display properly with the orientation of the computer. In this orientation, the left-handed writer can comfortably use the computer in the landscape mode. Again, the writer can rest the palm of the hand along the upwardly-facing left side and lower end surfaces of the housing during input.

In addition to the features identified above, the pen-based computer can include additional features, such as an integral modem (not shown); a DC power port 200; line in/line out ports 201, 202; microphone ports 203; headphone ports 204; a modem outlet (not shown) for communication via 2,400-bps MNP 5 and 9,600-bps send/receive fax; PCMCIA type I, II, III slot 206; and an optical serial SCSI interconnect (not shown) providing high band-width optical interconnection for a parallel port, a serial port, an SCSI port for external floppy, CD-ROM or hard disk drive, and a PS/2 style keyboard connector 207. The keyboard connector can be connected to a keyboard for simultaneous use with the active matrix display, however, the active matrix display is typically used independently of the keyboard. Finally, the pen-based computer can include infra-red transceivers (not shown) mounted at appropriate locations around the housing for communication with remote transceivers for access to, e.g., a LAN or token ring.

Further, the pen-based computer can be linked to peripheral equipment (e.g., printers, hard disk drives, etc.) to provide further wordprocessing and spreadsheet capabilities. For example, the pen-based computer can be removably supported on a tilt base which supports the pen-based computer and provides additional floppy or hard disk drives. The base can also include a drawer for storage of a keyboard. The electrical connection between the base and the pen-based computer can be mechanical, but is preferably optical. Such a base and keyboard for the pen-based computer is shown and described in U.S. Ser. No. 07/975,845 filed Nov. 13, 1992, and entitled "Computer Keyboard Storage and Retrieval System", now U.S. Pat. No. 5,287,245, issued Feb. 15, 1994.

Figure 12:
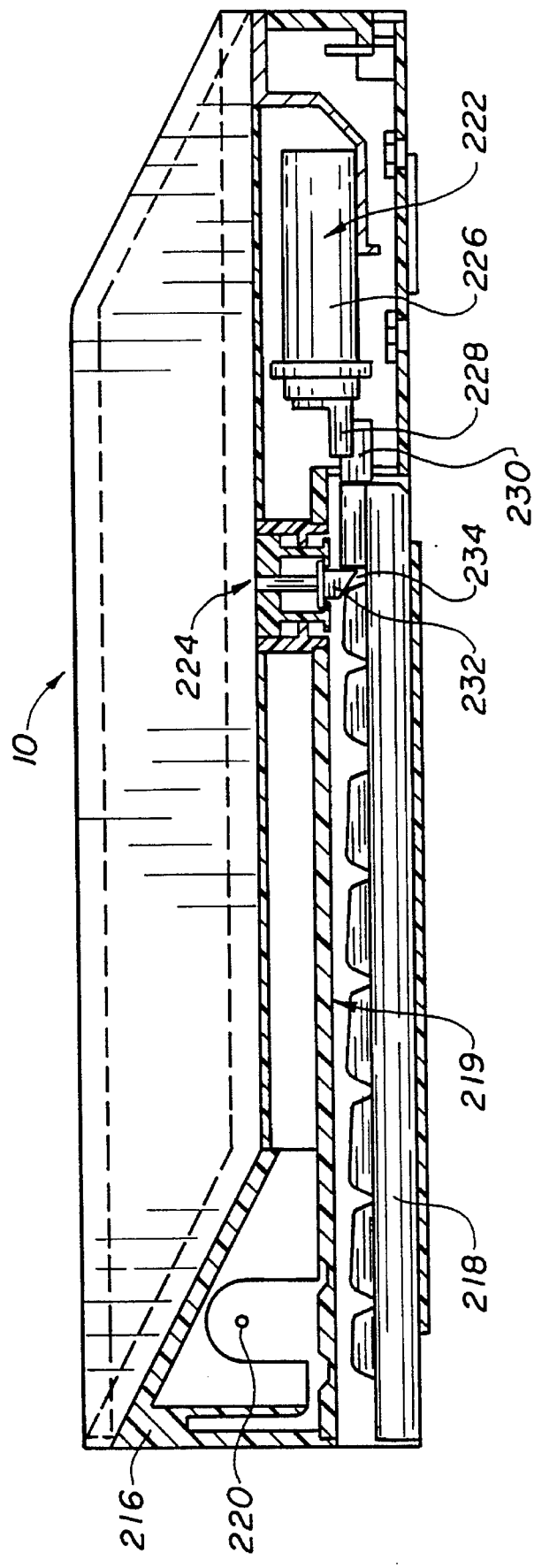
FIG. 12 is a sectional side view of the storage and retrieval system for the present invention, the keyboard being shown in a stored and locked position.

As illustrated in FIGS. 12 and 13, such a system provides an enclosure 216 which supports the pen-based computer 10. The computer is attached to the enclosure by means of a hinge 220, although other means of attaching the computer to the enclosure are contemplated. The removable keyboard 218 is slidably attached to the bottom portion 219 of the enclosure 216 by means of slide rails.

The keyboard storage and retrieval system further includes a manually operated damping device 222 and a manually operated mechanical latching device 224. The damping device 222 is used to eject the removable keyboard 218 from the enclosure 216. The latching device 224 is used to secure the removable keyboard to the enclosure.

The damping device 222 comprises a cylinder 226, a piston rod 228 contained within and extendable from the cylinder 226, and an offset piston rod extension 230. The piston rod extension 230 is offset with respect to the piston 228 so as to contact an edge of the removable keyboard 218. In this manner, the piston rod is able to eject the removable keyboard from the bottom portion 219 of the enclosure 216 when the piston rod is fully extended.

As shown in FIG. 12, the manually operated damping device 222 is prevented from ejecting the removable keyboard 218 from the enclosure 216 because the mechanical latching device 224 has locked the keyboard in its stored position. A locking pin 232 extending from the latching device 224 mates with a recess 234 in the keyboard to prevent ejection of the keyboard whenever the computer 10 is in the closed position shown in FIG. 12.

If the computer 10 is then lifted into an open position, as shown in FIG. 13, the removable keyboard may be ejected using the damping device 222. By pushing on the keyboard, thereby depressing the piston 228 fully into the cylinder 226, the piston will extend to a second position. Although the keyboard will not be fully ejected, at least a portion of the keyboard will be able to be grasped by a user and fully removed from the enclosure. If, however, the computer remains in the closed position, the action of the damping device 222 will be inhibited by the locking pin 232 and the keyboard cannot be removed from the enclosure.

Figure 5B:
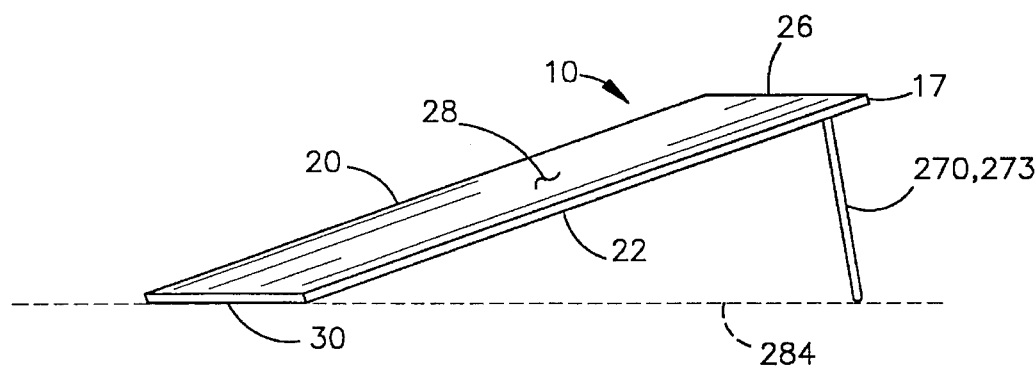
FIG. 5B is a lower edge view of the pen-based computer of FIG. 1.
Figure 6:
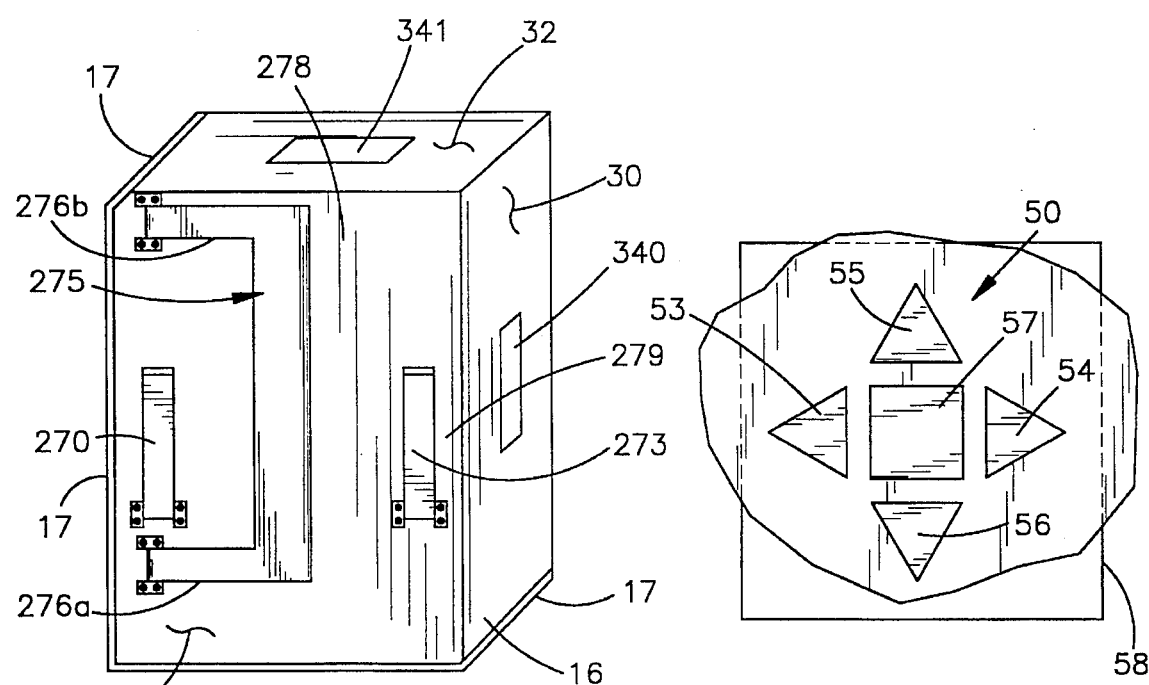
FIG. 6 is a bottom plan view of the pen-based computer.

During use, the pen-based computer can be supported on a user's lap and the information can be input directly onto the screen using a stylus or finger. Alternatively, the computer can be displayed at an angle on a support surface (e.g., a table), to facilitate viewing and information input. To this end, as illustrated in FIGS. 5A, 5B and 6, the computer housing includes display legs 270, 273, 275 stored in recesses in the back surface of the housing. The display legs 270, 273 and 275 are preferably formed from aluminum and are normally flush with the bottom surface 22 of the housing. The legs can be pivoted outwardly away from the housing to support the housing at an appropriate angle (see, e.g., FIGS. 5A, 5B).

The display legs include a first pair of legs 270, 273, which can be pivoted outwardly for viewing the computer when the computer is in the portrait orientation; and a second integral leg 275 which can be pivoted outwardly when the computer is in the landscape orientation. The second integral leg preferably includes a pair of side supports 276a, 276b, which are interconnected by a horizontal support 277.

The slanted parallelepiped-shaped housing, and in particular the angled design of the side and end surfaces, facilitates supporting the angled computer on a horizontal support surface 284 in the manners described previously for finger or stylus touch and for viewing. When supported in an angled fashion, the end surface 32 of the housing will match the horizontal support surface 284 to provide a stable base for the angled computer in the portrait orientation (see, e.g., FIG. 5A); while the side surface 30 will match the horizontal support surface 284 to provide a stable base for the angled computer in the landscape orientation (see, e.g., FIG. 5B). The relatively thin edge 33 of the side surfaces lies substantially flush with the support surface 84 and therefore does not interfere with writing.

The side and end surfaces 30, 32 support the flat panel display at an angle of between 10 and 45 degrees for proper viewing and comfortable writing. Although the angle of the downwardly facing side and end surfaces 30, 32 is preferably the same angle as the upwardly facing side and end surfaces 26, 28 for symmetry reasons, the downwardly facing side and end surfaces could extend at a different angle than the upwardly facing side and end surfaces if it is desired to provide a different viewing angle for the flat panel display. In other words, the angles of the upwardly facing and downwardly facing side and end surfaces can be varied slightly from each other, depending on comfort and other ergonomic considerations.

Further, the recesses in the bottom surface of the housing also enable the legs to be stored flush with the housing for mounting the computer on a wall or for laying the computer flat on a support surface or lap. For mounting on a wall, wall mount recesses 278, 279 can also be provided to hang the computer on a wall in either a portrait (recess 278) or a landscape (recess 279) orientation.

Additionally, the angled side surfaces of the computer allow two or more computers to be overlapped adjacent one another on a flat surface for simultaneous operation.

Further, additional support and communication recesses 340, 341 can be formed in the left side surface 30 and the top side surface 32 for receiving a tilt stand projection (not shown) from the above-mentioned enclosure 216 (FIGS. 12, 13). In this case, the recess 340 formed in the left side surface 30 will support the computer in the landscape orientation on the enclosure; while the recess 341 formed in the top surface 32 will support the computer in the portrait orientation on the enclosure. These support and communication recesses can be formed, such as described-previously, with connections (e.g., optical connections) for interconnecting the pen-based computer with the enclosure.

Accordingly, the present invention provides a pen-based computer with adaptability for either left-handed or right-handed users. Moreover, the configuration of the computer housing provides a design which is aesthetically pleasing and which can be comfortably used. The angled side surfaces have a configuration which provides an optimum writing surface for both right and left-handed users while still providing proper viewing of the screen. Further, the pen-based computer maintains the speed and versatility of larger computers, yet is easily transportable because of its smaller size.

Although the above discussion has described the present invention with respect to certain preferred embodiments, it should be apparent to those skilled in the art upon reading and understanding the specification that certain alterations and modifications can be made to the invention. The present invention includes such equivalent alterations and modifications, and is limited only by the scope of the following claims.

What is claimed is:

1. A flat panel display for a computer, comprising:
   a screen display for display of text, data and graphic information,
   a signal path for connecting said screen display to the computer for communication of the text, data and graphic information which is at least temporarily stored in the computer and displayed on said screen display in one of a plurality of orientations relative to the orientation of said screen display,
   a plurality of switches in circuit communication with said signal path for determining in which one of said plurality of orientations the text, data and graphic information is displayed,
   said plurality of switches positioned in a cluster, and
   each of said switches corresponding to at least one of said plurality of orientations and positioned to indicate the corresponding orientation.

2. A flat panel display according to claim 1, wherein said flat panel display is rotatable 360 degrees in four 90 degree increments and said switches determine which one of four orientations the text, data and graphic information is displayed, such that the screen display of the text, data and graphic information is displayed consistent with the orientation of said flat panel display in any of said four orientations.

3. A flat panel display according to claim 2, wherein said switches are mounted exteriorly on said housing and manually actuable for changing the display orientation of the text, data and graphic information on said screen display.

4. A flat panel display as in claim 1, further including a computer housing, said flat panel display being mounted to an upper surface of said computer housing.

5. A flat panel display according to claim 1 wherein said plurality of switches comprises pushbutton switches.

6. A flat panel display according to claim 1 further comprising a sensor in circuit communication with said signal path such that a sensing event of said sensor causes said flat panel display to reset the orientation of the text, data and graphic information to a predetermined orientation.

7. A flat panel display according to claim 6 wherein said sensor comprises a pushbutton switch.

8. An electronic device comprising:
   (a) a central processing unit (CPU);
   (b) a flat panel display in circuit communication with said CPU for displaying a visual image corresponding to a set of data, said flat panel display capable of displaying the visual image in at least two orientations; and
   (c) at least one sensor in circuit communication with said flat panel display, said at least one sensor positioned and configured such that a sensing event of said at least one sensor is generated responsive to a change in the orientation of said flat panel display relative to the force of gravity, and wherein said sensor and said flat panel display are configured such that responsive to a sensing event of said at least one sensor, said flat panel display changes the orientation of the visual image from one of said at least two orientations to another of said at least two orientations.

9. An electronic device according to claim 8 wherein said at least one sensor comprises at least one mercury switch, said sensing event comprises a closure event of said at least one mercury switch, and said at least one mercury switch is positioned such that the mercury therein causes at least one closure event responsive to the orientation of said flat panel display being changed relative to the force of gravity.

10. An electronic device according to claim 9 further comprising an additional sensor in circuit communication with said flat panel display such that a sensing event of said additional sensor prevents said flat panel display from changing the orientation of the visual image in response to a sensing event of said at least one sensor.

11. An electronic device according to claim 10 wherein said additional sensor comprises a pushbutton switch.

12. An electronic device according to claim 8 wherein said electronic device is configured such that said electronic device can be comfortably gripped, comfortably held in one hand, and easily picked-up from a support surface.

13. An electronic device according to claim 8 further comprising an additional sensor in circuit communication with said flat panel display such that a sensing event of said additional sensor prevents said flat panel display from changing the orientation of the visual image in response to a sensing event of said at least one sensor.

14. An electronic device according to claim 13 wherein said additional sensor comprises a pushbutton switch.

15. A housed computer supporting pen inputs, comprising:
(a) an upper housing surface having an associated flat panel display in circuit communication with a central processing unit for displaying a visual image corresponding to a set of data, said flat panel display capable of displaying the visual image in at least two orientations; and
(b) at least one sensor in circuit communication with said flat panel display, said at least one sensor positioned and configured such that a sensing event of said at least one sensor is generated responsive to a change in the orientation of said flat panel display relative to the force of gravity, and wherein said at least one sensor and said flat panel display are configured such that responsive to a sensing event of said at least one sensor, said flat panel display changes the orientation of the visual image from one of said at least two orientations to another of said at least two orientations.

16. A housed computer supporting pen inputs according to claim 15 wherein said at least one sensor comprises a mercury switch, said sensing event comprises a closure event of said at least one mercury switch, and said at least one mercury switch is positioned such that the mercury therein causes at least one closure event responsive to the orientation of said flat panel display being changed relative to the force of gravity.

17. A housed computer supporting pen inputs according to claim 16 further comprising an additional sensor in circuit communication with said flat panel display such that a sensing event of said additional sensor prevents said flat panel display from changing the orientation of the visual image in response to a sensing event of said at least one sensor.

18. A housed computer supporting pen inputs according to claim 17 wherein said additional sensor comprises a pushbutton switch.

19. A housed computer supporting pen inputs according to claim 15 wherein said housed computer is configured such that said housed computer can be comfortably gripped, comfortably held in one hand, and easily picked-up from a support surface.

20. A housed computer supporting pen inputs according to claim 15 further comprising an additional sensor in circuit communication with said flat panel display such that a sensing event of said additional sensor prevents said flat panel display from changing the orientation of the visual image in response to a sensing event of said at least one sensor.

21. A housed computer supporting pen inputs according to claim 20 wherein said additional sensor comprises a pushbutton switch.

22. A housed computer supporting pen inputs, comprising:
(a) an upper housing surface having an associated flat panel display in circuit communication with a central processing unit for displaying a visual image corresponding to a set of data, said flat panel display capable of displaying the visual image in at least two orientations; and
(b) a plurality of sensors in circuit communication with said flat panel display, said sensors positioned and configured such that a sensing event of at least one of said sensors is generated responsive to a change in the orientation of said flat panel display relative to the force of gravity, wherein each of said sensors corresponds to at least one orientation of said housed computer, and wherein said sensors and said flat panel display are configured such that responsive to the sensing event of said at least one sensor, said flat panel display changes the orientation of the visual image to the orientation corresponding to the at least one sensor.

23. A housed computer supporting pen inputs according to claim 22 wherein said sensors comprise mercury switches, said sensing events comprise closure events of said mercury switches, and said mercury switches are positioned such that the mercury therein causes at least one closure event responsive to the orientation of said display being changed.

24. A housed computer supporting pen inputs according to claim 23 further comprising an additional sensor in circuit communication with said flat panel display such that a sensing event of said additional sensor prevents said flat panel display from changing the orientation of the visual image in response to a sensing event of said at least one sensor.

25. A housed computer supporting pen inputs according to claim 24 wherein said additional sensor comprises a pushbutton switch.

26. A housed computer supporting pen inputs according to claim 22 wherein said plurality of sensors comprises a ring-shaped frame having mercury therein and having one recess for each sensor of said plurality of sensors, said sensing events comprise closure events, and each recess is positioned such that the mercury in said ring-shaped frame causes a closure event responsive to the orientation of said display being changed.

27. A housed computer supporting pen inputs according to claim 26 further comprising an additional sensor in circuit communication with said flat panel display such that a sensing event of said additional sensor prevents said flat panel display from changing the orientation of the visual image in response to a sensing event of said at least one sensor.

28. A housed computer supporting pen inputs according to claim 27 wherein said additional sensor comprises a pushbutton switch.

29. A housed computer supporting pen inputs according to claim 22 wherein said housed computer is configured such that said housed computer can be comfortably gripped, comfortably held in one hand, and easily picked-up from a support surface.

30. A housed computer supporting pen inputs according to claim 22 further comprising an additional sensor in circuit communication with said flat panel display such that a sensing event of said additional sensor prevents said flat panel display from changing the orientation of the visual image in response to a sensing event of said at least one sensor.

31. A housed computer supporting pen inputs according to claim 30 wherein said additional sensor comprises a pushbutton switch.

* * * * *